United States Patent
Ganesan et al.

(10) Patent No.: US 11,283,599 B2
(45) Date of Patent: Mar. 22, 2022

(54) REUSABLE KEY GENERATED CIPHERTEXT DECRYPTION

(71) Applicant: Oracle International Corporation, Redwood Shores, CA (US)

(72) Inventors: Dharmalingam Ganesan, Crofton, MD (US); David M. Clifton, Ellicott City, MD (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 48 days.

(21) Appl. No.: 16/824,943

(22) Filed: Mar. 20, 2020

(65) Prior Publication Data

US 2021/0297241 A1 Sep. 23, 2021

(51) Int. Cl.
*H04L 9/06* (2006.01)
*H04L 29/06* (2006.01)

(52) U.S. Cl.
CPC .............................. *H04L 9/0656* (2013.01)

(58) Field of Classification Search
CPC .................................................. H04L 9/0656
USPC ......................................................... 380/42
See application file for complete search history.

(56) References Cited

U.S. PATENT DOCUMENTS

2009/0292941 A1* 11/2009 Ganai ................ G06F 11/3636
714/2
2015/0082370 A1* 3/2015 Jayaraman ............. H04L 63/20
726/1

OTHER PUBLICATIONS

Malozemoff et al., "Automated Analysis and Synthesis of Block-Cipher Modes of Operation", 2014 IEEE 27th Computer Security Foundations Symposium.
Mason et al., "A Natural Language Approach to Automated Cryptanalysis of Two-time Pads", CC 06, Oct. 30-Nov. 3, 2006, Alexandria, Virginia.

* cited by examiner

*Primary Examiner* — Michael S McNally
(74) *Attorney, Agent, or Firm* — Potomac Law Group, PLLC

(57) ABSTRACT

Embodiments decrypt a list of ciphertexts by determining one or more constraints for plaintext messages that were converted to the list of ciphertexts using a block cipher when generating the ciphertexts. Embodiments model the constraints as an optimization problem and solve the optimization problem using one or more Satisfiability Modulo Theories ("SMT") solvers to generate an SMT solution, where the solution includes the plaintext messages.

20 Claims, 4 Drawing Sheets

REUSABLE KEY GENERATED CIPHERTEXT DECRYPTION

FIELD

One embodiment is directed generally to cryptography, and in particular to a computer system for decrypting ciphertext generated by a reusable key.

BACKGROUND INFORMATION

In cryptography, ciphertext is the result of encryption performed on plaintext using an algorithm, referred to as a "cipher". Ciphertext is also known as encrypted or encoded information because it includes a form of the original plaintext that is unreadable by a human or computer without the proper cipher to decrypt it. Decryption, the inverse of encryption, is the process of turning ciphertext into readable plaintext.

In "symmetric" cryptography, a block cipher is an algorithm that encrypts a finite size block of plaintext message using a secret symmetric key. For example, the Advanced Encryption Standard ("AES") algorithm encrypts only 128-bit (or 16 bytes) of data, while the Data Encryption Standard ("DES") algorithm encrypts only 64-bit (or 8 bytes) of data. In order to encrypt messages that are longer than the block length of the selected block cipher algorithm, several known block cipher modes can be used. For example, the counter mode ("CTR") and the Galois Counter Mode ("GCM"), among others, can be used to encrypt a large volume of data. In general, the block cipher modes divide the plaintext message into one or more blocks and introduce randomness using a random number, referred to as the initialization vector ("IV"). The IV helps in hiding the patterns, if any, about the underlying plaintext messages that are encrypted.

A well-known precondition when using the CTR/GCM modes is that the (IV, Key) pair should be unique for each message. The same precondition is applicable to the known one-time pad ("OTP") algorithm, which is an encryption technique that cannot be cracked, but requires the use of a one-time pre-shared key the same size as, or longer than, the message being sent. For these encryption techniques, if this precondition is violated, a cryptanalyst or illicit party may be able derive the list of messages that were encrypted using the same (IV, Key) pair.

SUMMARY

Embodiments decrypt a list of ciphertexts by determining one or more constraints for plaintext messages that were converted to the list of ciphertexts using a block cipher when generating the ciphertexts. Embodiments model the constraints as an optimization problem and solve the optimization problem using one or more Satisfiability Modulo Theories ("SMT") solvers to generate an SMT solution, where the solution includes the plaintext messages.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

Figure 1:
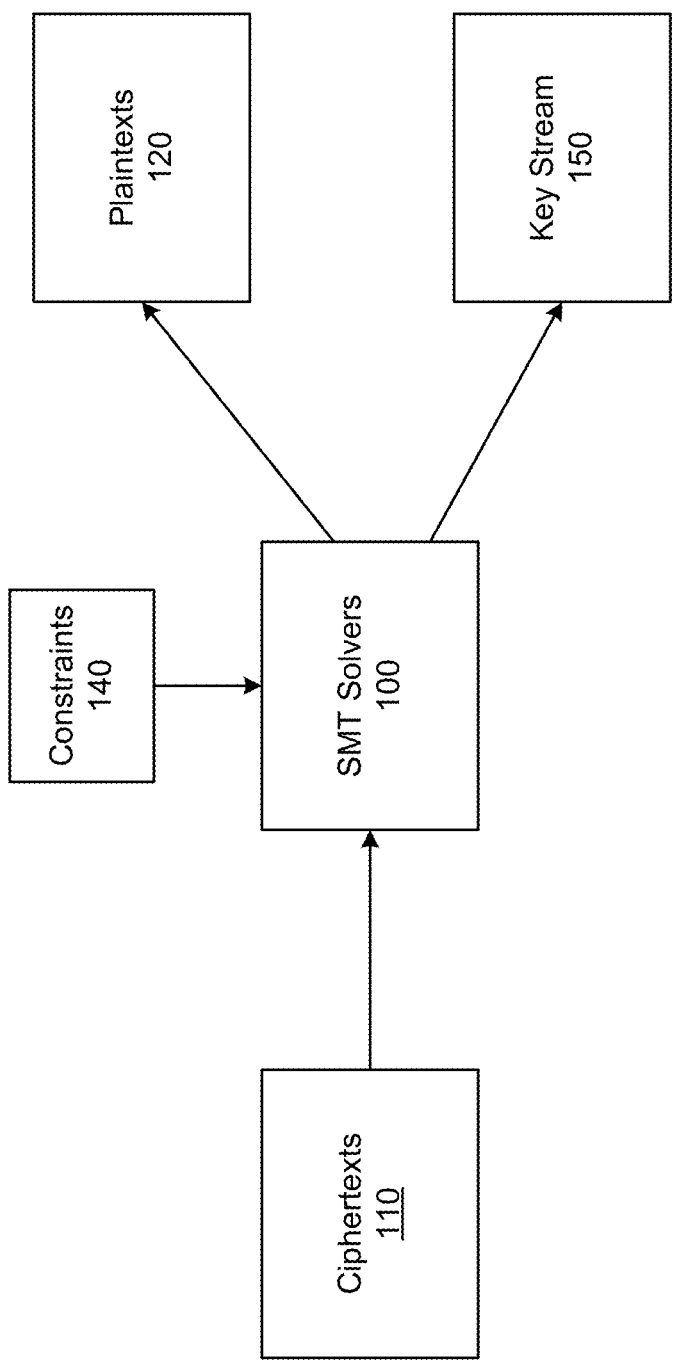
FIG. 1 is a block diagram overview of embodiments of the invention.

Embodiments decrypt ciphertexts when the generally precondition that the (IV, Key) pair should be unique for each message has been violated. Given a list of ciphertexts (i.e., encrypted plaintexts), embodiments apply a general-purpose, Satisfiability Modulo Theories ("SMT") solver to expose the plaintexts that were encrypted using the same (IV, Key) pair. The input in embodiments is the list of ciphertexts and the output is the list of plaintexts and the symmetric key.

Embodiments first convert the cryptanalysis problem into a search problem and then employ one or more SMT solvers to solve the search problem. The solutions suggested by the SMT solvers include the unknown encryption key as well the list of plaintexts that were encrypted using the key. Instead of developing specific computer programs to solve this cryptanalysis problem, the search goals merely have to be specified as constraints for the SMT solver to solve. For example, some context about the underlying plaintexts may be known, such as all characters are numbers, or all characters are in English alphabets, etc. These kinds of patterns are encoded as constraints for the solver to satisfy.

In embodiments, these constraints are modeled as an optimization problem. Constraints can be considered as a system of equations on unknown variables for which solutions are determined. In embodiments, the unknown variables are the list of plaintexts and the key. "Modeling" in embodiments means that the system of equations are specified the syntax provided by the SMT solver. For example, it may be stated that all characters of the unknown plaintexts are numbers. Or, there may be cases in which the nature of the plaintext is unknown. In such cases, the solver may be directed to find solutions that maximizes certain goals. For example, if the context is English, then it is more natural to expect alphabets rather than special characters such as '@', '#', '$', etc., although such characters are possible in an English text. In embodiments, the system of equations are specified and the solver is asked to find solutions that maximize the goal, such as to the find the plaintext that has more English alphabets as oppose to special characters.

The SMT solvers find the solution to this optimization problem. In order to scale up the performance of SMT solvers, embodiments can run them in parallel by dividing the ciphertexts into multiple blocks If there is a known ciphertext/plaintext pair, then SMT solvers can find the key without requiring the optimization problem to be modeled. However, if the keys partially overlap, there is a need to formally specify which parts of the keys are assumed to be overlapping with each other.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 is a block diagram overview of embodiments of the invention. Embodiments include one or more SMT solvers 100 that receives constraints 140 for solvers 100 to solve. Constraints 140 include search goals related to input ciphertexts 110 that are desired to be decrypted. Ciphertexts 110 in embodiments are encoded using a block cipher mode in which multiple messages are encrypted using the same <IV, Key> or a Vernam cipher in which the same key stream is reused. SMT solvers 100 then generate the plaintexts 120 as well as the key stream 150 if the Vernam cipher is used, or the key 150 if the block cipher mode is used.

Figure 2:
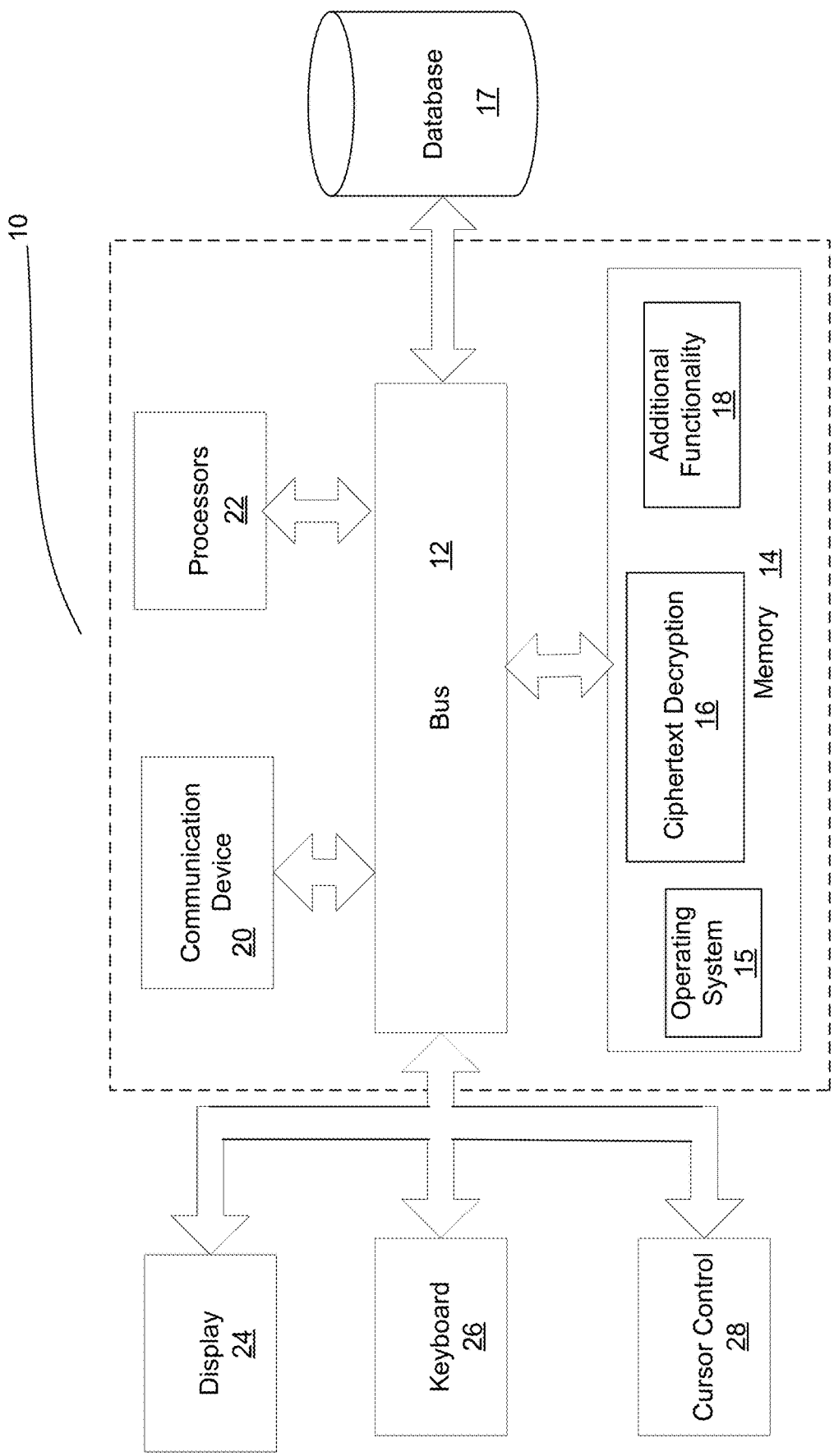
FIG. 2 is a block diagram of a computer server/system in accordance with an embodiment of the present invention that can be used to implement any of the functionality disclosed herein.

FIG. 2 is a block diagram of a computer server/system 10 in accordance with an embodiment of the present invention that can be used to implement any of the functionality disclosed herein. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include ciphertext decryption module 16 that decrypts ciphertext into plaintext, and all other functionality disclosed herein. System 10 can be part of a larger system. Therefore, system 10 can include one or more additional functional modules 18 to include the additional functionality that can utilize encryption/decryption functionality. For example, when a web browser connects to a hotel registration site, it uses modern ciphers such as AES in the GCM or CTR mode and modules, and modules 18 can include the hotel functionality that has a need for decryption functionality disclosed herein and implemented by module 16. A file storage device or database 17 is coupled to bus 12 to provide centralized storage for modules 16 and 18, including constraints and decrypted keys. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Encryption and decryption techniques include stream ciphers and block ciphers. A stream cipher encrypts a stream of data using the exclusive or ("XOR") operator, shown herein as: ⊕. Using x, k, and y as the plaintext, secret key stream and the ciphertext, respectively, embodiments define the encryption and decryption functions as follows:

Encryption: $y=Enc_k(x)=x \oplus k$

Decryption: $x=Dec_k(y)=y \oplus k$

A stream cipher (as defined above) is also referred to as an XOR cipher, a Vernam cipher, or a one-time pad. The stream cipher algorithm for encryption and decryption is unbreakable when the key stream is randomly generated and is used only once. Thus, this algorithm is also a one-time pad.

As disclosed, a stream cipher requires a key stream which has the same length as the plaintext. This precondition on the key stream length can be a problem if the plaintext is very long, such as a few megabytes. Further, the same key stream cannot be reused. In contrast to the stream cipher, a block cipher encrypts a block of plaintext at a time. Further, with a block cipher, the same key can be used for encrypting multiple messages. For example, the Advanced Encryption Standard ("AES") is a modern block cipher that encrypts 128-bit of data at a time. In general, several megabytes of data can be encrypted using the same key. Thus, block ciphers are often used in practice.

In contrast, since a block cipher can encrypt only a fixed size of data, block ciphers modes are used to encrypt a volume of data. Block cipher modes partition the input data into multiple blocks which can be encrypted using block cipher algorithms. In addition, many block cipher modes help introduce randomness to hide patterns in the plaintext. For example, if the first block of data and the last block are the same, this pattern can be hidden from any illicit party with the help of a block cipher mode.

Embodiments utilize the two block cipher modes of counter mode ("CTR") and Galois counter mode ("GCM"). Further, block ciphers are deterministic functions (i.e., encrypting the same plaintext will produce the same ciphertext). This may not be a desired behavior because patterns about the plaintext can be inferred from the ciphertext. To solve this problem, an initialization vector ("IV"), which is a random number, is used in the construction of many block cipher modes. The IV plays the major role of hiding patterns about the plaintext by introducing randomness into the encryption process. The IV is not a secret. It just has to be random for many cipher modes.

Figure 3A:
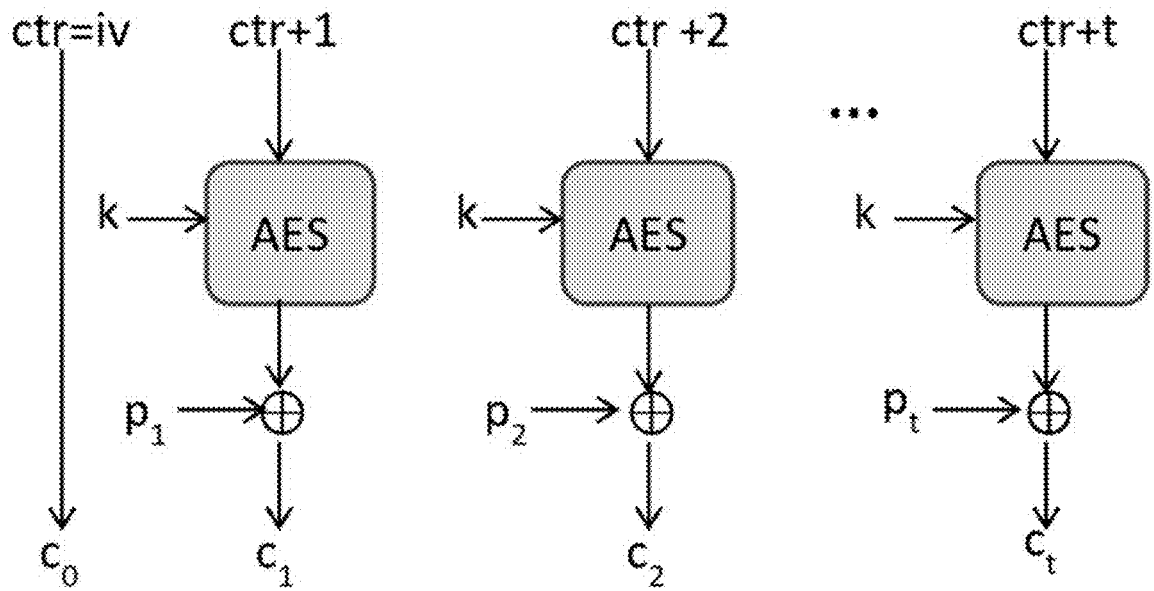
FIGS. 3A and 3B illustrate how an IV is used in two specific block ciphers modes, CTR and GCM.
Figure 3B:
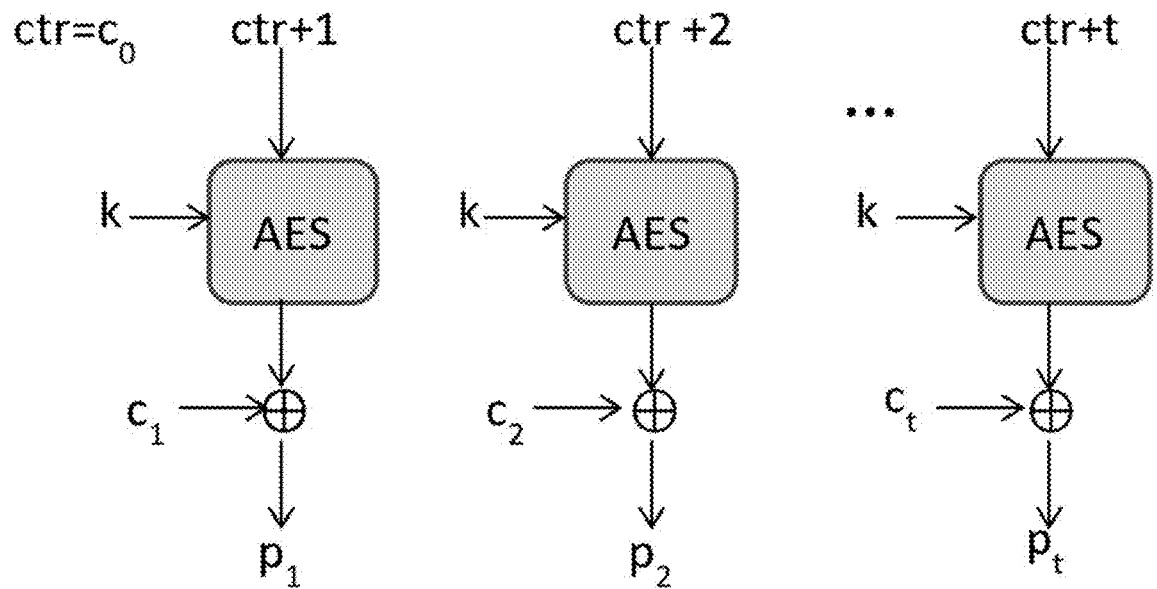

FIGS. 3A and 3B illustrate how the IV (also referred to as a "nonce") is used in two specific block ciphers modes, CTR and GCM.

FIG. 3A illustrates how the CTR mode can be instantiated to encrypt a plaintext made of t blocks ($p_1, p_2, \ldots, p_t$). The counter value is initialized by the IV. AES-CTR mode means that the AES cipher is used to encrypt the input counter with a secret symmetric key k. The output of the AES is used as the key stream to encrypt each block of plaintext. As shown in FIG. 3A, in the CTR mode, the IV is used to derive the key stream. Unique key streams are generated for each plaintext block by encrypting the counter value using a key. The counter value is simply incremented by one and then the block cipher (e.g., AES) is called to generate a key stream.

FIG. 3B illustrate the decryption process in the CTR mode. The initialization vector is nothing but the first ciphertext block $c_0$, randomly generated as part of the encryption process. The key stream is derived using the same encryption key k which was used during the encryption process. In order to decrypt the ciphertext, which is made of t+1 blocks ($c_0, c_1, c_2, \ldots, c_t$), each ciphertext block is xor-ed with the key stream. Thus, the output of the decryption process is the plaintext blocks ($p_1, p_2, \ldots, p_t$).

In contrast to the CTR mode, the GCM mode not only offers confidentiality but also integrity. In other words, if an "enemy" or illicit party edits the ciphertext blocks, the CTR mode will not be able to detect this integrity problem, but it will be detected by the GCM mode. However, in general, in embodiments, the integrity checking capability of the GCM mode is not relevant. In general, the encryption and decryption process in the GCM mode is the same as that of the CTR mode, and both the GCM and CTR modes derive key streams using the IV vector.

It has been proven that an XOR-based, Vernam cipher is unbreakable if the key stream is random and used only once. In other words, each message is encrypted using a unique, random key stream. In general, the encryption and decryption process of the Vernam/XOR cipher and the block cipher modes such as the CTR and GCM, internally have the same structure. Specifically, the key streams are first generated, and then the XOR operator is used, as shown in FIGS. 3A and 3B. Therefore, the Vernam cipher is vulnerable when the same key stream is reused, and the CTR and GCM modes are vulnerable when the same IV and Key pair is reused. Equivalently, if multiple messages are encrypted using the same <IV, Key>, then both the CTR and GCM mode are vulnerable to attacks because the key streams that are derived from the pair will be the same. This is due to the fact that the AES block cipher is a deterministic function, meaning AES(ctr, k) will generate the same key stream as the output if called multiple times on the same input. A severe consequence is that multiple messages will end up being XOR-ed using the same key stream. When the key streams are reused, an illicit party may be able to recover the underlying plaintext messages.

There are multiple reasons why the same (IV, Key) pair could have been used in a system. For example, in the GCM mode, after encrypting approximately $2^{36}$ bytes using the same key, the IV and/or Key has to be rotated. Otherwise, multiple blocks of the plaintext would have been encrypted using the same (IV, Key) pair. Similarly, in the CTR mode, a programmer might have used a simple counter such as zero, one, two, etc. as possible IV values. In this context, IVs will overlap between messages, thus, leading to the (IV, key) reuse problem.

In general, embodiments are based on leveraging the power of SMT solvers for cryptanalysis. An SMT instance is a formula in first-order logic, where some function and predicate symbols have additional interpretations, and SMT is the problem of determining whether such a formula is satisfiable. SMT generalizes boolean satisfiability ("SAT") by adding equality reasoning, arithmetic, fixed-size bit-vectors, arrays, quantifiers, and other useful first-order theories. An SMT solver is a tool for deciding the satisfiability (or dually the validity) of formulas in these theories. SMT solvers enable applications such as extended static checking, predicate abstraction, test case generation, and bounded model checking over infinite domains. One embodiment uses the "Z3" SMT solver from Microsoft Corp.

A cryptanalysts, in using embodiments, instead of developing custom algorithms and computer programs, specifies the high-level properties of the plaintexts they expect in a given context. For example, if multiple credit card numbers are encrypted using the same key stream, the cryptanalyst advises the SMT solvers to search for numbers with certain structures. The general purpose SMT solvers, such as the Z3 SMT solver, will explore the space of possibilities and offer the highly likely list of plaintexts that match the search goals (or constraints) formulated by the cryptanalysts.

Embodiments are independent of natural language structure and applicable to different contexts, as long as the constraints on the hidden plaintexts can be formulated. In addition, embodiments are, in general, complimentary to known solutions, in that models of natural languages, if available, can also be "plugged-in" to guide the SMT solvers. For example, known models of a bigram can be expressed as constraints to guide the SMT solvers. However, in embodiments, given enough number of ciphertexts, the SMT solvers are automatically able to suggest potential plaintexts, without the need from manual inputs from humans and/or statistical models (e.g., N-gram).

Figure 4:
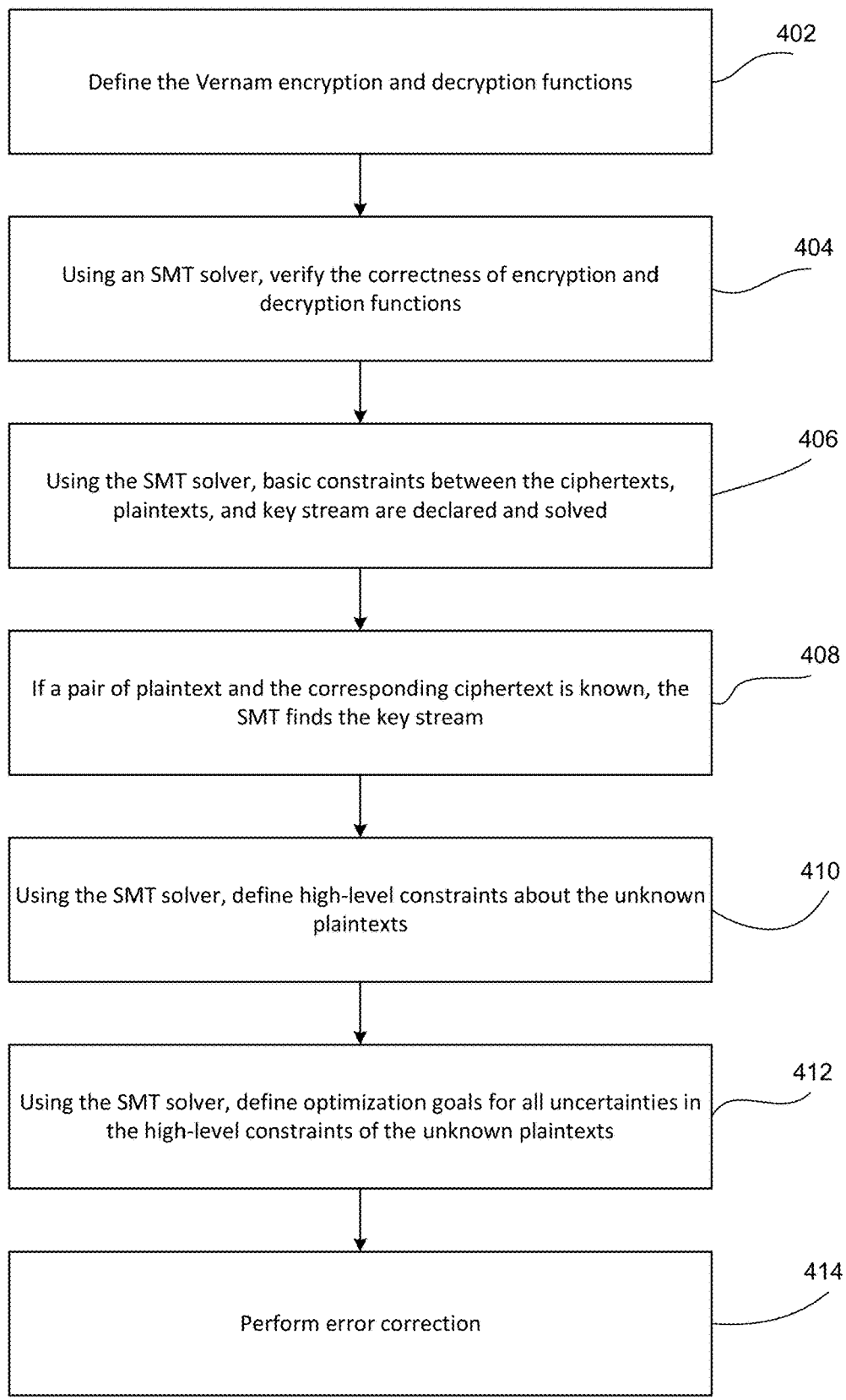
FIG. 4 is a flow diagram of the functionality of the ciphertext decryption module of FIG. 2 for decrypting ciphertexts in accordance with one embodiment.

FIG. 4 is a flow diagram of the functionality of ciphertext decryption module 16 of FIG. 2 for decrypting ciphertexts in accordance with one embodiment. For the functionality of FIG. 4, the input is a list of ciphertexts (e.g., 110 of FIG. 1), and the output is a list of plaintexts and the key stream (e.g., 120 and 150, respectively, of FIG. 1). In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, the Vernam encryption and decryption functions are defined. Although Vernam functions are used here, embodiments are applicable to all ciphers and modes in which reusing the same key results in disclosing the XOR of two plaintexts. Equivalently, embodiments are applicable to all ciphers that have the Vernam XOR cipher as the built-in structure.

At 404, SMT solvers 100 verify the correctness of encryption and decryption functions. 402 and 404 in embodiments have to be done only once because they describe general functionality that is needed to bootstrap the cryptanalysis process.

At 406, basic constraints between the ciphertexts, plaintexts, and key stream are declared and solved by SMT solver 100. At 408, if a pair of plaintext and the corresponding ciphertext is known, SMT solver 100 finds the key stream. Otherwise, functionality resumes at 412.

At 410, using SMT solver 100, high-level constraints about the unknown plaintexts are defined. In embodiments, the functionality at 410 is an optional step, but is often required for a good performance. At 412, using SMT solver 100, optimization goals for all uncertainties in the high-level constraints of the unknown plaintexts are defined.

At 414, error correction is performed.

Referring to 402, as disclosed above, when the same (IV, Key) pair is used to encrypt multiple plaintext messages, the key stream will be reused during the encryption (or decryption) process which uses the Vernam cipher algorithm internally. Embodiments are agonistic to block/stream cipher modes, meaning if a mode has the Vernam cipher structure then embodiments are relevant for that mode. Thus, it is enough to model the Vernam cipher in order for an SMT solver to automate the cryptanalysis process.

For the Vernam cipher algorithm example/embodiment, the description below formalizes the algorithm using the Python syntax, where "^" is used as the XOR operator instead of "⊕" which was used above. Without loss of generality, it is assumed that the input arguments to both encrypt and decrypt functions are of the same length, which is a precondition of the Vernam cipher algorithm. In one embodiment, the input arguments are as follows ("algorithm 1"):

```
def enc(m, k):
    return m ^ k
def dec(c, k):
    return c ^ k
```

Referring to 404, SMT solver 100 is used to verify algorithm 1 above is correct. More specifically, SMT solver 100 is used to prove that decrypting an encrypted message will return the message, as detailed in pseudocode 1 below.

Traditionally, humans were used to prove the correctness of encryption and decryption operations using the algebraic properties of the XOR operator. In contrast, in embodiments, SMT solver 100 is used to synthesize the proof automatically. If there are any mistakes in the specification of the encryption (enc) and/or decryption (dec), the theorem will be disproved by SMT solver 100. Embodiments create symbolic variables "m" and "k" to denote an arbitrary message and the key stream, respectively. SMT solver 100 then proves that dec(enc(m, k), k) is equal to m, for all possible m and k, and similarly, enc(dec(m, k), k)=m, as shown in the following pseudocode that verifies the correctness of the Vernam cipher ("pseudocode 1"):

```
s = Solver()
theorem = dec(enc(m, k), k) == m
prove(theorem)
```

Referring to 406, let $C_0, C_1, \ldots C_{n-1}$ be the list of ciphertexts that have to be reversed. Let $P_0, P_1, \ldots, P_{n-1}$ be the list of corresponding unknown plaintexts. Let K be the unknown key stream that was used to encrypt the unknown plaintexts. Embodiments declare the unknown variables $[P_0, P_1, \ldots, P_{n-1}]$ and the key stream as symbolic variables for SMT solver 100 to solve. The constraints among the ciphertexts, plaintexts and the key stream are as follows:

$$C_i = enc(P_i, K), \text{ for } 0 \leq i \leq n-1.$$

The above constraint means that the ciphertexts were produced using the encryption function but with unknown plaintexts and the key stream. SMT solver 100 can be instantiated and can be used to provide a list of plaintexts that satisfy the above constraint. If SMT solver 100 finds a unique solution (i.e., a model), then the unknown plaintexts have successfully be obtained. A "solution" refers to the list of plaintexts and the key stream that satisfies the property dec(enc(message, k), k) is equal to the message. However, if SMT solver 100 suggests multiple solutions, then the additional constraints need to be added, as disclosed below.

Referring to 408, in the case where one pair of plaintext and the corresponding ciphertext is known, this knowledge can be encoded as a constraint for SMT solver 100 to search for. Consider two ciphertexts, $c_1$ and $c_2$. Assume that it is known that the plaintext $p_1$ corresponds to $c_1$. The goal is to find out the unknown plaintext $p_2$ which corresponds to the given ciphertext $c_2$.

In this example, two symbolic variables can be declared (e.g., $p_2$ and k (for the key stream)) and SMT solver 100 is asked to find concrete values to both of them. pseudocode 3 below illustrates how the known plaintext-ciphertext pair can be specified and SMT solver 100 can be asked to find the unknown plaintext and the key. When the following pseudocode ("pseudocode 3") for specifying known plaintext-ciphertext (if any) is run on the Z3 solver, the unknown plaintext is received as "PQ" and the key as 0x1a45:

```
#Initialize c1, p1, and c2 to known values
p1 = 0x5859 # "XY"in ASCII
c1 = 0x4a14
c2 = 0x4a14
# Declare symbolic variables p2 and k
p2, k = BitVecs('p2 k', c2.bit_length())
# Create a solver
s = Solver()
# Add constraints
s.add(c1 == enc(p1, k))
s.add(c2 == enc(p2, k))
if s.check() == sat: # constraints satisfied?
    model = s.model()
    print model.evaluate(p2)
    print model.evaluate(k)
```

In known solutions, the unknown plaintext $p_2$ is determined by using the algebraic properties of XOR. In contrast, embodiments leverage SMT solver 100 to synthesize the values of unknown variables $p_2$ and k from the values of known variables. In examples where there is not any known pair of ciphertext and its corresponding plaintext, 408 is skipped.

Referring to 410, constraints are defined about the unknown plaintexts. For example, there may be some insights that the ciphertexts are all credit card numbers or texts written in English, etc. Such insights can be codified as constraints for SMT solvers. The more constraints specified about the unknown plaintext, the better the results are as the space of solutions is reduced.

For example, assume it is known that only English alphabets and spaces are part of the plaintext. Such knowledge can be codified as constraints. For example, in the pseudocode below (pseudocode 4), the isAlphaOrSpace function checks whether a given character is an English alphabet and/or space. A high-level constraint that the unknown plaintext character of the plaintext $p_1$ is an English alphabet and/or space is defined. Additional constraints similar to the one given in pseudocode 3 can be added. If statistical models (e.g., N-grams) are available, then it can also expressed as constraints that will help the solver to search for solutions to the unknown symbolic variables, namely the plaintexts and the key stream. The following pseudocode ("pseudocode 4") adds constraints about the plaintexts:

```
defisAlphaOrSpace(b):
    return Or(And(0x41 <= b, b <= 0x5A),
        And(0x61 <= b, b <= 0x7A),
        0x20 == b)
# Create a solver
s = Solver()
# Add constraints about the plaintexts
s.add(isAlphaOrSpace(p1) == true)
```

Working Example

A complete working example is now disclosed to show how to add constraints and automatically reverse the unknown plaintexts and the key stream, using SMT solver 100. Assume three ciphertexts $c_1$, $c_2$, and $c_3$. For simplicity, limit the size of these ciphertexts to just one byte only, which is the reason the bit vector size is 8 (BIT_VEC_SIZE=8) in pseudocode 4 above. Let $c_1$=0x66, $c_2$=0x32, and $c_3$=0x23. The challenge is to find the corresponding plaintext bytes and the key stream. The following pseudocode ("pseudocode 5") is an example on how to add constraints about unknown plaintexts:

```
BIT_VEC_SIZE = 8
p1, p2, p3, k =BitVecs('p1 p2 p3 k', BIT_VEC_SIZE)
c1 = enc(p1, k)
c2 = enc(p2, k)
c3 = enc(p3, k)
s = Solver()
# Message bytes are English alphabets or space
s.add(isAlphaOrSpace(p1) == True, isAlphaOrSpace(p2) == True,
    isAlphaOrSpace(p3) == True)
# c1 = 0x66, c2 = 0x32, c3 = 0x23
s.add(c1 == 0x66, c2 == 0x32, c3 == 0x23)
while s.check() == sat:
    model = s.model()
    # Print the plaintexts and the key stream!
```

-continued
```
    print "p1 =", chr(model.evaluate(p1).as_long())
    print "p2 =", chr(model.evaluate(p2).as_long())
    print "p3 =", chr(model.evaluate(p3).as_long())
    print "k =", chr(model.evaluate(k).as_long())
    # Any other solutions other than the current ones ?
    s.add(p1 != model[p1], p2 != model[p2], p3 != model[p3])
```

When the cryptanalysis problem formulated in pseudocode 5 is run using the Z3 SMT solver, it prints out: $p_1$=' '(i.e., a space), $p_2$='t', and $p_3$='e', as well as the key stream k='F'. Further, SMT solver 100 confirmed that there does not exist any other solution for the given ciphertexts; otherwise, the solver would not have terminated the "while" loop.

As shown in pseudocode 5, the constraints are formulated about the unknown plaintexts, instead of developing cryptanalysis algorithms. In contrast, in known solutions, this problem is solved by using the patterns in the binary representation of ASCII characters rather than asks SMT solver 100 to search for a solution, based on the given set of constraints.

Referring to 412, in the previous functionality, the plaintexts were obtained by just specifying the constraints. However, in embodiments, there may be a need for more flexibility when there is uncertainty about the constraints. For example, there may be knowledge that the plaintext characters are mostly English alphabets, but may also include special characters such as numbers, commas, semicolons, etc. Therefore, in embodiments, the built-in optimization capabilities of modern SMT solvers is leveraged.

Optimization goals are needed at 412 if certain classes of solutions based on the contextual knowledge about the unknown plaintexts are preferred. For example, if it is known that all characters of the unknown plaintexts are only numbers, then this can be formulated as a regular constraint as opposed to an optimization goal. Equivalently, optimization goals are only needed if the goal is to maximize (or minimize) values of unknown variables. In the context of English or other natural language texts, it is often the goal to maximize the number of printable characters, as oppose to special characters. SMT solvers provide built-in solvers that solve optimization problems that maximize certain goals. For example, solvers can be used to find a maximum integer x such that 2*x+3*y>=7 and y>=0; x=2 and y=1 is an optimal solution.

For example, if it is desired to maximize the number of printable characters by asking the SMT solver to satisfy the optimization goal, a high-level structure is shown as follows where the "goal" is a constraint to be satisfied by the solver.

```
s = Optimize()
s.maximize(goal)
```

The following pseudocode ("pseudocode 6") shows a fragment that specifies an optimization goal that maximizes the number of occurrences of printable characters for each plaintext. The function countNumPrintable just checks whether the symbolic byte chosen by the SMT solver is a printable character. If yes, it increments the number of printable characters in the symbolic plaintext. One benefit of using the optimization engine is that SMT solver 100, when faced with multiple potential solutions as plaintexts, will pick the appropriate plaintext that will maximize the optimization goal. In experiments, this optimization strategy was found to be very useful to reverse the unknown plaintexts that were all encrypted using the same key stream.

```
def runSMT(cipherTexts):
    s = Optimize()
    numCipherTexts = len(cipherTexts)
    for i in range(0, numCipherTexts):
        # Maximize the number of printable characters in plaintexts
        s.maximize(countNumPrintable(globals()['p%i'%i]))
    if s.check() == sat:
        model = s.model()
        # Print all plaintexts and the key stream
```

In experiments, the optimization process pseudocode 6 was used on a given list of 11 ciphertexts shown below. The goal is to reverse the 11$^{th}$ ciphertext (i.e., the target ciphertext) and the key. An example output of the learned plaintext corresponding to the challenge ciphertext, which was the 11$^{th}$ ciphertext in the given list is also shown below:

It is noted that embodiments do not analyze the binary representation of ASCII characters nor match the known plaintext words such as "the", for example, as with known solutions. Instead, in embodiments, SMT solver 100 automatically synthesizes the above plaintext, just based on the search goal.

As disclosed above, with embodiments, SMT solver 100 can derive the plaintexts from the given ciphertexts, using the optimization goals input as constraints. If the unknown plaintext is a natural language, mistakes in the output of SMT solver 100 may need to be corrected. The corrections may be done manually by, for example, using a dictionary or through the use of auto-correction algorithms to fix errors. Many search engines can also correct minor spelling mistakes in the extracted plaintexts. For example, the misspelled word "secuet" was part of the output, which was corrected to "secret" using Google. To sum up, the output shown ciphertext #1:
315c4eeaa8b5f8aaf9174145bf43e1784b8fa00dc71d885a804e5ee9fa40b16349c146fb778cdf2d3af
f021dfff5b403b510d0d0455468aeb98622b137dae857553ccd8883a7bc37520e06e515d22c954eba
5025b8cc57ee59418ce7dc6bc41556bdb36bbca3e8774301fbcaa3b83b220809560987815f652867
64703de0f3d524400a19b159610b11ef3e
ciphertext #2:
234c02ecbbfbafa3ed18510abd11fa724fcda2018a1a8342cf064bbde548b12b07df44ba7191d9606e
f4081ffde5ad46a5069d9f7f543bedb9c861bf29c7e205132eda9382b0bc2c5c4b45f919cf3a9f1cb741
51f6d551f4480c82b2cb24cc5b028aa76eb7b4ab24171ab3cdadb8356f
ciphertext #3:
32510ba9a7b2bba968005d43a304b5714cc0bb0c8a34884dd91304b8ad40b62b07df44ba6e9d8a2
368e51d04e0e7b207b70b968261112bacb6c866a232dfe257527dc29398f5f3251a0d47e503c66e9
35de81230b5967afb5f41afa8d661cb
ciphertext #4:
32510ba9aab2a8a4fd06414fb517b5605cc0aa0dc91a8908c2064ba8ad5ea06a029056f47a8ad330
6ef5021eafe1ac01a81197847a5c68a1b78769a37bc8f4575432c198ccb4ef63590256e305cd3a954
4ee4160ead45aef520489e7da7d835402bca670bda8eb775200b8dabbba246b130f040d8ec6447e2
c767f3d30ed81ea2e4c1404e1315a1010e7229be6636aaa
ciphertext #5:
3f561ba9adb4b6ebec54424ba317b564418fac0dd35f8c08d31a1fe9e24fe56808c213f17c81d9607c
ee021dafe1e001b21ade877a5e68bea88d61b93ac5ee0d562e8e9582f5ef375f0a4ae20ed86e935de
81230b59673fb4302cd95d770c65b40aaa065f2a5e33a5a0bb5dcaba43722130f042f8ec85b7c2070
ciphertext #6:
32510bfbacfbb9befd54415da243e1695ecabd58c519cd4bd2061bbde24eb76a19d84aba34d8de28
7be84d07e7e9a30ee714979c7e1123a8bd9822a33ecaf512472e8e8f8db3f9635c1949e640c62185
4eba0d79eccf52ff111284b4cc61d11902aebc66f2b2e436434eacc0aba938220b084800c2ca4e693
522643573b2c4ce35050b0cf774201f0fe52ac9f26d71b6cf61a711cc229f77ace7aa88a2f19983122b
11be87a59c355d25f8e4
ciphertext #7:
32510bfbacfbb9befd54415da243e1695ecabd58c519cd4bd90f1fa6ea5ba47b01c909ba7696cf606ef
40c04afe1ac0aa8148dd066592ded9f8774b529c7ea125d298e8883f5e9305f4b44f915cb2bd05af51
373fd9b4af511039fa2d96f83414aaaf261bda2e97b170fb5cce2a53e675c154c0d9681596934777e2
275b381ce2e40582afe67650b13e72287ff2270abcf73bb028932836fbdecfecee0a3b894473c1bbeb
6b4913a536ce4f9b13f1efff71ea313c8661dd9a4ce
ciphertext #8:
315c4eeaa8b5f8bffd11155ea506b56041c6a00c8a08854dd21a4bbde54ce56801d943ba708b8a35
74f40c00fff9e00fa1439fd0654327a3bfc860b92f89ee04132ecb9298f5fd2d5e4b45e40ecc3b9d59e9
417df7c95bba410e9aa2ca24c5474da2f276baa3ac325918b2daada43d6712150441c2e04f656551
7f317da9d3
ciphertext #9:
271946f9bbb2aeadec111841a81abc300ecaa01bd8069d5cc91005e9fe4aad6e04d513e96d99de25
69bc5e50eeeca709b50a8a987f4264edb6896fb537d0a716132ddc938fb0f836480e06ed0fcd6e975
9f40462f9cf57f4564186a2c1778f1543efa270bda5e933421cbe88a4a52222190f471e9bd15f652b65
3b7071aec59a2705081ffe72651d08f822c9ed6d76e48b63ab15d0208573a7eef027
ciphertext #10:
466d06ece998b7a2fb1d464fed2ced7641ddaa3cc31c9941cf110abbf409ed39598005b3399ccfafb6
1d0315fca0a314be138a9f32503bedac8067f03adbf3575c3b8edc9ba7f537530541ab0f9f3cd04ff50
d66f1d559ba520e89a2cb2a83
target ciphertext (decrypt this one):
32510ba9babebbbefd001547a810e67149caee11d945cd7fc81a05e9f85aac650e9052ba6a8cd825
7bf14d13e6f0a803b54fde9e77472dbff89d71b57bddef121336cb85ccb8f3315f4b52e301d16e9f52f904

In response, SMT solver 100 outputs the following plaintext (without quotes): "The secuet message is: Wht! using a ~tream cipher, never use the key more than on76".

above is thus easily corrected as "The secret message is: When using a stream cipher, never use the key more than ones".

Known auto-correction tools generally can fix typos based on a knowledge grammar of words. These tools can be leveraged to fix the minor mistakes in the plaintexts produced by the SMT solvers. In other embodiments, a dictionary of known words can be added and the SMT solver can be forced to find words from the dictionary.

In embodiments, when there are many ciphertexts and all or most of them are long, SMT solvers may not scale due to the large number of possible keys and plaintexts to explore. Therefore, in embodiments, the ciphertexts are chopped into smaller blocks that can be analyzed independently on one or more machines. Another complimentary approach is to leverage SMT solvers' parallel analysis capabilities to distribute the constraint solving or optimization problem into one or more solvers/machines. In experiments, only 10 bytes (i.e., characters) were passed at a time for each ciphertext and there were never any memory exhaustion problems due to this strategy of chopping the ciphertexts into smaller blocks.

Embodiments can also be applied in cases where the key bytes partially overlap. For example, consider the CTR mode. Assume that the programmer used IV=0 and IV=1 to encrypt messages p1 and p2, respectively. Suppose plaintext p1 is made of two blocks and p2 is only one block. In this scenario, the keys will overlap due to the structure of the CTR mode. In other words, the key used to encrypt the second block of the first message is the same as the key used to encrypt the first block of the second message. Embodiments can codify this scenario and reverse the plaintexts (2nd block of the first message and 1st block of the second message) using SMT solvers.

As an example, the below SMT source code captures this scenario. It shows how to automatically reverse the ciphertexts using a simplified version, without loss of generality, in which the 2nd block of the first message and the 1st block of the second message are encrypted using the same key. It is assumed that the content of the 2nd block of the first message is known, but the 1st block of the second message is unknown.

In the below code, the first message is made of two blocks: the first block of 16 A's; the second block of 16 B's. The ciphertext c1 corresponds to the first message while c2 corresponds to the unknown second message p2. The goal is to find p2 automatically using an SMT solver.

```
pi_str = "AAAAAAAAAAAAAAAABBBBBBBBBBBBBBBB"
c1 = 0x801A368943157A71E35022074A771EF3C326E298A4E3D77D3FBECC774771992A
c2 = 0xD80BD5FAA1CEE11F3488AE727756BA1C
BLOCK_LEN = 16
# returns v[pos]
def getByteByPos(v, pos):
# z3 bit vectors are Big-Endian
align_left = v.size()-8*(pos +1)
return Extract(align_left + 7, align_left, v)
p1, k1 = BitVecs('p1 k1', c1.bit_length())
p2, k2 = BitVecs('p2 k2', c2.bit_length())
s = Solver()
s.add(p1 == int(b2a_hex(p1_str), 16))
s.add(c1 == enc(p1, k1))
s.add(c2 == enc(p2, k2))
for pos in range(BLOCK_LEN):
s.add(getByteByPos(k2, pos) == getByteByPos(k1, BLOCK_LEN+pos))
if s.check() == sat:
modl =s.model()
print "keystream k1 = ", hex(modl.evaluate(k1).as_long())
print "keystream k2 = ", hex(modl.evaluate(k2).as_long())
p2_int = modl.evaluate(p2).as_long()
print bytearray.fromhex(format(p2_int, 'x'))
```

In the above code, the statement Extract( . . . ) specifies the constraint that key bytes are overlapping between two different messages. In the "for" statement (see for pos in range), the constraint about the overlapping keys is added.

When running the above code using the Z3 SMT solver, the following output is produced. The second message is "You Got It Great". In addition, it also shows the keys k1 and k2 discovered by the SMT solver. It can be confirmed that key k2 is a substring of key k1 as expected.

```
$ python iv_overlap.py
keystream k1 =
0xc15b77c802543b30a21163460b365fb28164a0dae6a1953f7dfc8e350533db68L
keystream k2 = 0x8164a0dae6a1953f7dfc8e350533db68L
You Got It Great
```

As disclosed, in embodiments, an XOR-based Vernam cipher algorithm (or other type of cipher algorithm) can be modeled using SMT solvers. The correctness of the Vernam cipher algorithm can be automatically verified using SMT solvers. When a pair of ciphertext and corresponding plaintext is known, the SMT solvers can reveal the unknown plaintexts as well as the reused key stream from the given ciphertexts.

Further, when (IV, Key) is reused in block cipher modes such as CTR and GCM, the SMT solvers can reveal the plaintexts from the given ciphertexts. This is because the key streams that are derived from the given (IV, Key) will be the same due to the structure of these block cipher modes. If the same key stream is reused for encrypting multiple plaintexts using the Vernam cipher algorithm, the SMT solvers can reveal the plaintexts from the given ciphertexts.

Further, if specific properties are known, such as all the characters of the unknown plaintexts are only numbers, then such properties can be encoded as constraints to the SMT solvers. By employing the optimization engines that are part of SMT solvers, the SMT solvers can be directed to search for plaintexts that will maximize the given search goal (i.e., constraints).

Further, by using a dictionary, minor mistakes in the suggested plaintexts for natural languages can be corrected. This process may be automated using existing tools that auto-correct small typos.

In embodiments, the quality of the SMT solvers' results can be improved by adding constraints about the statistical properties of the natural language such as in English, the most frequent letters are 'e', 't', and 'a'. As shown in experimental results, these constraints are not necessary when there are sufficient numbers of ciphertexts to analyze. Further, due to the structure of the Vernam cipher algorithm, longer ciphertexts (e.g., more than 10 bytes) can be efficiently analyzed in parallel using the SMT solvers, by simply chopping the given ciphertexts into smaller blocks.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of decrypting a list of ciphertexts, the method comprising:
   determining one or more constraints for plaintext messages that were converted to the list of ciphertexts using a block cipher when generating the ciphertexts;
   modeling the constraints as an optimization problem; and
   solving the optimization problem using one or more Satisfiability Modulo Theories (SMT) solvers to generate an SMT solution;
   wherein the solution comprises the plaintext messages.

2. The method of claim 1, wherein the solution further comprises a keystream used to generate the ciphertexts.

3. The method of claim 2, wherein a first ciphertext and corresponding plaintext message is known.

4. The method of claim 1, wherein a same initialization vector (IV) and key pair is used to generate the ciphertexts.

5. The method of claim 1, wherein an XOR-based Vernam cipher algorithm is used to generate the ciphertexts.

6. The method of claim 1, wherein the constraints comprise: the plaintext messages consist of English letters, numbers and spaces.

7. The method of claim 1, further comprising automatically correcting errors in the plaintext messages.

8. The method of claim 1, further comprising dividing the ciphertexts into a plurality of smaller blocks and solving the optimization problem with an SMT solver corresponding to each block in parallel.

9. The method of claim 1, wherein the constraints comprise key bytes are overlapping between two different messages.

10. A non-transitory computer readable medium having instructions stored thereon that, when executed by one or more processors, cause the processors to decrypt a list of ciphertexts, the decrypting comprising:
    determining one or more constraints for plaintext messages that were converted to the list of ciphertexts using a block cipher when generating the ciphertexts;
    modeling the constraints as an optimization problem; and
    solving the optimization problem using one or more Satisfiability Modulo Theories (SMT) solvers to generate an SMT solution;
    wherein the solution comprises the plaintext messages.

11. The computer readable medium of claim 10, wherein the solution further comprises a keystream used to generate the ciphertexts.

12. The computer readable medium of claim 11, wherein a first ciphertext and corresponding plaintext message is known.

13. The computer readable medium of claim 10, wherein a same initialization vector (IV) and key pair is used to generate the ciphertexts.

14. The computer readable medium of claim 10, wherein an XOR-based Vernam cipher algorithm is used to generate the ciphertexts.

15. The computer readable medium of claim 10, wherein the constraints comprise: the plaintext messages consist of English letters, numbers and spaces.

16. The computer readable medium of claim 10, the decrypting further comprising automatically correcting errors in the plaintext messages.

17. The computer readable medium of claim 10, the decrypting further comprising dividing the ciphertexts into a plurality of smaller blocks and solving the optimization problem with an SMT solver corresponding to each block in parallel.

18. The computer readable medium of claim 10, wherein the constraints comprise key bytes are overlapping between two different messages.

19. A ciphertext decryption system comprising:
    one or more hardware processors executing instructions and adapted to:
        receive one or more constraints for plaintext messages that were converted to a list of ciphertexts to be decrypted using a block cipher when generating the ciphertexts;
        model the constraints as an optimization problem; and
        solve the optimization problem using one or more Satisfiability Modulo Theories (SMT) solvers to generate an SMT solution;
    wherein the solution comprises the plaintext messages.

20. The system of claim 19, wherein the solution further comprises a keystream used to generate the ciphertexts.

* * * * *

UNITED STATES PATENT AND TRADEMARK OFFICE
CERTIFICATE OF CORRECTION

PATENT NO. : 11,283,599 B2  
APPLICATION NO. : 16/824943  
DATED : March 22, 2022  
INVENTOR(S) : Ganesan et al.

Page 1 of 1

It is certified that error appears in the above-identified patent and that said Letters Patent is hereby corrected as shown below:

On the Title Page

Item (56), Column 2, under Other Publications, Line 5, delete "CC 06," and insert -- CC"06, --, therefor.

In the Specification

In Column 2, Line 55, delete "blocks" and insert -- blocks. --, therefor.

In Column 8, Line 15, delete ". . ." and insert -- . . . , --, therefor.

In Column 8, Line 51, delete "0x1a45:" and insert -- "0×1a45:" --, therefor.

In Column 9, Line 32, delete "defisAlphaOrSpace(b):" and insert -- "def isAlphaOrSpace(b):" --, therefor.

In Column 9, Line 49, delete "0x66," and insert -- "0×66," --, therefor.

In Column 9, Line 49, delete "0x32," and insert -- "0×32," --, therefor.

In Column 9, Line 49, delete "0x23." and insert -- "0×23." --, therefor.

In Column 10, Line 7, delete "ones ?" and insert -- "ones?" --, therefor.

In Columns 13-14, Line 24, delete "pi_str" and insert -- "p1_str" --, therefor.

Signed and Sealed this  
Sixteenth Day of August, 2022

Katherine Kelly Vidal  
*Director of the United States Patent and Trademark Office*